US012519406B2

(12) United States Patent
Kariya et al.

(10) Patent No.: US 12,519,406 B2
(45) Date of Patent: Jan. 6, 2026

(54) GENERATOR SYSTEM AND A METHOD FOR OPERATING A GENERATOR SET

(71) Applicant: Cummins Power Generation Inc., Minneapolis, MN (US)

(72) Inventors: Vipulkumar Kariya, Pune (IN); Chandrakant Salunke, Pune (IN); Ulhas Deutkar, Pune (IN)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 18/617,111

(22) Filed: Mar. 26, 2024

(65) Prior Publication Data

US 2025/0309800 A1 Oct. 2, 2025

(51) Int. Cl.
*H02P 9/02* (2006.01)
*G01K 3/00* (2006.01)

(52) U.S. Cl.
CPC ............... *H02P 9/02* (2013.01); *G01K 3/005* (2013.01)

(58) Field of Classification Search
CPC .................................. H02P 9/02; G01K 3/005
See application file for complete search history.

(56) References Cited

U.S. PATENT DOCUMENTS

| | | | |
|---|---|---|---|
| 3,577,050 A | 5/1971 | Ringland et al. | |
| 10,202,886 B1 | 2/2019 | Teslovich | |
| 10,690,074 B2 | 6/2020 | Oguguo et al. | |
| 10,924,044 B2 | 2/2021 | Oguguo et al. | |
| 2009/0109039 A1* | 4/2009 | Kellzi | B60R 25/04 340/584 |
| 2011/0080040 A1 | 4/2011 | Kumar | |
| 2014/0354241 A1 | 12/2014 | Perisic et al. | |
| 2015/0198133 A1* | 7/2015 | Ballard | F01P 11/20 392/465 |
| 2016/0114818 A1* | 4/2016 | Melas | B61L 15/0072 701/2 |
| 2018/0266349 A1 | 9/2018 | Almkvist | |
| 2019/0010910 A1* | 1/2019 | Arnot | B60W 30/18018 |

(Continued)

FOREIGN PATENT DOCUMENTS

| | | |
|---|---|---|
| CN | 201318241 Y | 9/2009 |
| CN | 110758122 A | 2/2020 |

(Continued)

OTHER PUBLICATIONS

Cummins, "Cummins India Limited advances its mission of powering a more prosperous world; receives certification for CPCB IV emissions standard compliance," Jun. 13, 2023, https://www.cummins.com/news/releases/2023/06/13/cummins-india-limited-advances-its-mission-powering-more-prosperous-world.

(Continued)

*Primary Examiner* — Sean Gugger
(74) *Attorney, Agent, or Firm* — Foley & Lardner LLP

(57) ABSTRACT

Presented herein are techniques for operating a generator system. The system includes a generator set. The system includes a sensor configured to detect a temperature of a coolant for the generator set. The system includes a controller. The controller can be configured to receive an indication of the temperature of the coolant from the sensor. The controller can be configured to initiate an action to modify cranking of the generator set in response to the temperature of the coolant being below a first threshold.

14 Claims, 6 Drawing Sheets

(56) References Cited

U.S. PATENT DOCUMENTS

2019/0226441 A1* 7/2019 Anderson ............... F02N 19/02
2019/0241091 A1  8/2019 Lee et al.

FOREIGN PATENT DOCUMENTS

| GB | 2 547 787 A | 8/2017 |
|---|---|---|
| RU | 2609537 C1 | 2/2017 |
| WO | WO-2015/105614 A1 | 7/2015 |

OTHER PUBLICATIONS

PCT International Search Report and Written Opinion for Application No. PCT/IB2023/058408 mailing date Dec. 5, 2023 24 pages.
Sorlei Ioan-Sorin et al: "Fuel Cell Electric Vehicles—A Brief Review of Current Topologies and Energy Management Strategies," Energies, vol. 14, No. 1, Jan. 5, 2021 (Jan. 5, 2021), pp. 1-29, XP93105274, DOI: 10.3390/en14010252, Retrieved from the Internet: URL:https://mdpi-res.com/d_attachment/energies/energies-14-00252/article_deploy/energies-14-00252.pdf.
Tsai-Fu Wu et al: "3C Strategy for Inverters in Parallel Operation Achieving an Equal Current Distribution," IEEE Transactions on Industrial Electronics, IEEE Service Center, Piscataway, NJ, USA, vol. 47, No. 2, Feb. 1, 2000 (Feb. 1, 2000), XP011023658, ISSN: 0278-0046.

* cited by examiner

GENERATOR SYSTEM AND A METHOD FOR OPERATING A GENERATOR SET

BACKGROUND

A generator set may include an engine and a generator to provide power to one or more electric components electrically coupled thereto.

SUMMARY

Diesel engines can include turbochargers to boost the power output of the engines, and can include exhaust after treatment systems (EATS/ATS) to treat exhaust gases. While delivering greater power density by turbocharging, the speeds at which turbochargers may increase, which can make turbocharger bearing lubrication important to maintain proper operation of the turbocharger and components thereof. At cold temperatures, oil availability for turbocharger bearing lubrication may decrease, which can increase the risk of turbocharger failure. Also at cold temperatures, unburnt hydrocarbon (uHC) output may increase due to lower combustion temperatures, incomplete combustion, and/or misfiring. In some instances, face plugging of the EATS/ATS can happen because of unburnt hydrocarbon in the exhaust gases. Various such considerations can make effective cold start of diesel engines challenging. In some systems, coolant heating aid is provided for operation under cold temperatures (e.g., sub-zero temperatures) for pre-heating of the engine block coolant. However, the heating element power supply may be externally connected, and its operation may be manually managed. As such, it can be challenging for diesel systems to be consistently operated in accordance with target parameters under cold start conditions.

Systems and methods in accordance with the present disclosure can facilitate operation of diesel systems, such as generator sets (gensets), under cold start conditions, by inputs such as using coolant temperature and ambient temperature for control of cold cranking, such as to prevent cranking of the engine if a predefined coolant temperature is not met. An override feature can be provided for emergency operation of the generator set. The override feature may also be provided if a different thermal management system is preferred by customer. The controller can maintain a log of fault codes for traceability. The systems and methods described herein allow greater resilience of coolant related components by monitoring the temperature of the coolant and ensuring that cranking of the engine is only allowed when the coolant is above a certain threshold.

Aspects of the present disclosure are directed to a generator system. The system includes a generator set. The system includes a sensor configured to detect a temperature of a coolant for the generator set. The system includes a controller. The controller can be configured to receive an indication of the temperature of the coolant from the sensor. The controller can be configured to initiate an action to modify cranking of the generator set in response to the temperature of the coolant being below a first threshold.

In some embodiments, the sensor is a first sensor, the generator set further comprising a second sensor configured to detect an ambient temperature inside the generator set and near the air filter inlet. The controller can be configured to receive an indication of the ambient temperature of the generator set from the second sensor. The controller can be configured to initiate a second action in response to the ambient temperature of the generator set being below a second threshold and the temperature of the coolant being below the first threshold. In some embodiments, the controller is configured to initiate the action in response to the indication that the ambient temperature of the generator set is above the second threshold.

In some embodiments, the system can further include an engine control module coupled to the controller. The first sensor and the second sensor are coupled to the engine control module. The engine control module is configured to transmit a signal to the controller comprising an indication of at least one of the temperature of the coolant or the ambient temperature.

In some embodiments, the system further can include a crank relay coupled with the controller. The controller is configured to control operation of the crank relay to perform cranking of the generator set. The action can include sending a signal to the crank relay to prevent cranking of the generator set.

In some embodiments, the controller can be further configured to initiate a third action to modify cranking of the generator set in response to the temperature of the coolant being above the first threshold. The third action may include allowing the cranking of the generator set.

Aspects of the present disclosure are directed to a system for starting a generator set. The system includes a starter motor configured to activate a generator set. The system includes a controller. The controller is configured to receive, from a sensor, a temperature value. The controller is configured to evaluate one or more criteria for operation of the generator set based on the temperature value. The controller is configured selectively engage the starter motor to turn on the generator set responsive to the one or more criteria being met.

In some embodiments, the system includes a telematics interface configured to provide a notification of a state of the generator set. In some embodiments, the controller is configured to evaluate the one or more criteria based on a threshold for a temperature of a coolant for the generator set and the first temperature value indicates the temperature of a coolant for the generator set. In some embodiments, the controller is configured to evaluate the one or more criteria based on a threshold for an ambient temperature about the generator set and the second temperature value indicates the ambient temperature about the generator set. The system may further include a second sensor. The controller may be further configured to receive, from the second sensor, a second temperature value. The controller may be further configured to evaluate the one or more criteria for operation of the generator set based on the second temperature value and the first temperature value. The controller may be further configured to selectively engage the starter motor to turn on the generator set responsive to the one or more criteria being met.

In some embodiments, the second temperature value indicates an ambient temperature of the generator set. In some embodiments, the controller is configured to prevent the starter motor from turning on the generator set responsive to the one or more criteria not being met. In some embodiments, the controller is configured to evaluate a first of the one or more criteria for operation of the generator set based on a parameters selected for the generator set. In some embodiments, the first sensor is coupled to the controller. The coupling between the first sensor and the controller comprises a communicative coupling between the first sensor and one or more processors of the controller, the one or more processors configured to engage the starter motor to turn on the generator set.

Aspects of the present disclosure are directed to a method for operating a generator set. The method may include monitoring, by a controller, one or more temperature values associated with the generator set. The method may include comparing, by the controller, the one or more temperature values to a threshold. The method may include engaging a starter motor to turn on the generator set responsive to the one or more temperature values being above the threshold.

In some embodiments, the method may include preventing, by the controller, the starter motor from turning on the generator set responsive to the one or more temperature values being below the threshold.

In some embodiments, the method may include receiving, by the controller, an override request, such as from a user. The method can include engaging the starter motor to turn on the generator set. In some embodiments, the method may include implementing, by the controller, an override functionality configured to turn on the generator set.

In some embodiments, the method may include generating, by the controller, a fault code indicating the implementation of override functionality. In some embodiments, the method may include storing, by the controller, the fault code.

In some embodiments, the method may include sending, by the controller via a telematics interface, an indication of the implementation of the override functionality to a second user.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Presented herein is a cold start generator set (e.g., genset) system that includes protections for the generator set being started in cold conditions. The ability of diesel engines to start in cold conditions can be affected by factors such as ambient temperature and engine fluid temperatures (coolant, engine oil, fuel, diesel exhaust fluid). During the combustion phase under cold start conditions, a substantial amount of pollutants may be produced within the cylinder due to factors such as misfiring and incomplete combustion due to the low engine temperatures. Furthermore, exhaust aftertreatment devices may operate inefficiently since their minimum operation temperatures cannot be reached. In addition to this, at temperatures below 0° C., the possibility of continuous misfiring could impede the engine start.

The systems and methods described herein can address such considerations by monitoring the coolant temperature in real time through a remote monitoring system along with ambient temperature to develop cold cranking process. This process can mitigate user dependency and can serve as a closed loop system by taking input from coolant temperature & ambient temperature sensor. In this process, continuous monitoring of coolant temperature can be performed, and through inbuild logic and based on the logic, a decision of engine cranking can be determined. Pre heated coolant can allow the engine block as well as engine oil to attain required temperature to maintain proper operation of the turbocharger and the aftertreatment system.

To avoid errors in controlling of a preheating aid and/or to ensure the proper operation of the aftertreatment system and turbocharger, the systems and methods described herein implement a cold cranking process by taking input from coolant temperature sensor and ambient temperature sensor available on generator set. In some implementations, unless and until coolant temperature reaches to predefined value (e.g., greater than 40° C.) which is set and stored in a controller, the genset controller will not allow cranking of the engine.

Figure 1:
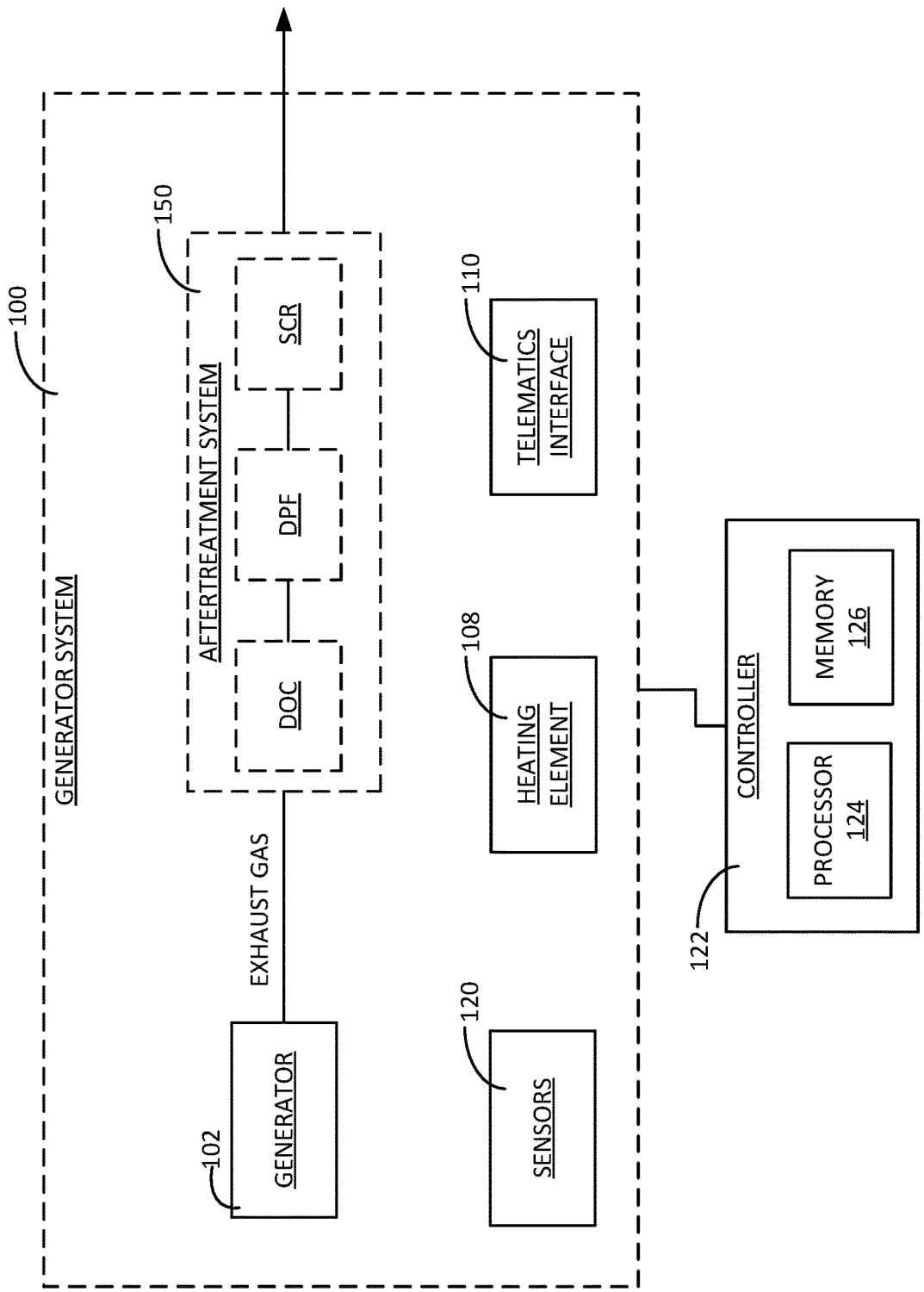
FIG. 1 is a block diagram of a generator system, according to some embodiments.

FIG. 1 shows a controller 122 coupled to a generator system 100. As a brief overview, the generator system 100 includes a generator set, a sensor 120 configured to detect a temperature of a coolant for the generator set, and a controller 122. The controller 122 is configured to receive an indication of the temperature of the coolant from the sensor 120 and initiate an action to modify cranking of the generator set in response to the temperature of the coolant being below a first threshold. In some embodiments, the sensor is a first sensor, the generator system further comprising a second sensor configured to detect an ambient temperature around the generator set. In such an embodiment, the controller 122 is configured to receive an indication of the ambient temperature of the generator set from the second sensor and initiate a second action in response to the ambient temperature of the generator set being below a second threshold and the temperature of the coolant being below the first threshold. In some embodiments, the controller 122 is configured to initiate the action in response to the indication that the ambient temperature of the generator set is above the second threshold. In some embodiments, initiate a third action to modify cranking of the generator set in response to the temperature of the coolant being above the first threshold. In some embodiments, the third action comprises allowing the cranking of the generator set.

In some embodiments, the generator system 100 includes an engine control module coupled to the controller 122, wherein the first sensor and the second sensor are coupled to the engine control module, wherein the engine control module is configured to transmit a signal to the controller comprising an indication of at least one of the temperatures of the coolant or the ambient temperature.

The generator system 100 can be included in a generator set. In some embodiments, the generator system 100 can be an ignition control system. The generator system 100 is shown to include a generator 102, an aftertreatment system 150 coupled with the generator 102, a telematics interface 110, and sensors 120.

The generator 102 as shown in FIG. 1 is structured as a compression-ignition internal combustion engine system. In various embodiments, the generator 102 can be structured as any of various types of internal combustion engine systems (e.g., spark-ignition) that utilize any type of fuel (e.g., gasoline, natural gas). The generator 102 can be or include an electric motor (e.g., a hybrid drivetrain).

The generator 102 includes one or more cylinders and associated pistons. Air from the atmosphere is combined with fuel, and combusted, to power the generator 102. Combustion of the fuel and air in the compression chambers within one or more cylinders of the generator 102 produces exhaust gas that can be vented to an exhaust pipe and to the aftertreatment system. In some embodiments, the generator 102 has a compression ratio representative of a target performance of the generator 102 and/or the fuel to be used by the generator 102, such as a compression ratio less than defined ratio.

The aftertreatment system 150 is structured to receive exhaust gas from the generator 102 and remove/mitigate harmful emissions from the exhaust gas before the exhaust gas is expelled to the environment. The aftertreatment system 150 can include one or more of a diesel oxidation catalyst (DOC), a diesel particulate filter (DPF), or a selective catalytic reduction (SCR).

The sensors 120 are coupled with the controller 122 and to one or more of the devices or systems of the generator system 100 (or of other systems/components of the associated generator set). The sensors are configured to detect and/or determine values associated with various properties of the generator system 100 and/or vehicle. Accordingly, the sensors 120 can include one or more of a temperature sensor (e.g., a thermocouple, a resistance temperature detector, etc., to determine a temperature of the exhaust gas), an emission sensor (e.g., to determine a proportion of oxygen and nitrous oxides in the exhaust gas, which is indicative of the level of harmful emissions in the exhaust gas and thus the efficiency of the engine), an engine speed sensor, sensors for the fueling system (e.g., to track a fuel injected quantity, a rail pressure, etc.), and so on. In some embodiments, certain of the sensors 120 are combined into a single sensor. In some embodiments, the sensors 120 are separate sensors. In some embodiments, a plurality of sensors (e.g., a plurality of temperature sensors, and/or a plurality of emission sensors) can be used.

A first sensor 120 of the sensors 120 may detect a temperature of a coolant for the generator 102. A second sensor 120 of the sensors 120 may detect a presence of the coolant in a fluid path coupled with the generator 102. The heating element 108 is coupled with the fluid path of the coolant. The controller 122 is configured to receive an indication of the temperature from the first sensor 106 and an indication of the presence of the coolant from the second sensor 120. The controller 122 is configured to selectively engage the heating element 108 responsive to the indication of the presence of the coolant and responsive to the temperature meeting a coolant heating condition. In some embodiments, the generator system 100 does not include the heating element 108, or the heating element 108 can be separate from one or more components of the generator system 100. This can allow temperatures associate with generator set to rise to a level that can allow cranking and starting of the generator set without causing any of issues associated with starting the generator set in cold conditions. In some embodiments, the sensor 120 is a first sensor and the temperature value is a first temperature value.

In some embodiments, the generator system 100 further includes a second sensor. In some embodiments, the controller 122 is configured to: receive, from the second sensor, a second temperature value; evaluate the one or more criteria for operation of the generator set based on the second temperature value and the first temperature value, and selectively engage the starter motor to turn on the generator set responsive to the one or more criteria being met. In some embodiments, the controller is configured to evaluate the one or more criteria based on a threshold for a temperature of a coolant for the generator set and the first temperature value indicates the temperature of a coolant for the generator set. In some embodiments, the controller is configured to evaluate the one or more criteria based on a threshold for an ambient temperature about the generator set and the second temperature value indicates the ambient temperature about the generator set. In some embodiments, the first sensor is coupled to the controller 122. The coupling between the first sensor and the controller 122 may include a communicative coupling between the first sensor and one or more processors of the controller 122, the one or more processors configured to engage the starter motor to turn on the generator set. In some embodiments, the controller 122 is configured to prevent the starter motor from turning on the generator set responsive to the one or more criteria not being met. In some embodiments, the controller 122 is configured to evaluate a first of the one or more criteria for operation of the generator set based on the threshold values. This can allow the controller 122 to prevent starting/cranking the generator set during cold conditions which can cause a variety of issues as explained above.

Referring further to FIG. 1, the 100 system includes or interfaces with the controller 122 to execute operations to manage the performance of the systems and methods described herein. The generator 102 can generate electrical energy, employing a coolant to cool a portion thereof. For example, the generator 102 can include an engine block fluidically coupled with a radiator or a coolant reservoir. Various sensors 120 can fill level sensors 120, ambient air sensors 120, or coolant temperature sensors 120. A heating element 108 can heat the coolant. For example, the heating element 108 can include a resistive element configured to provide thermal energy to the coolant upon a receipt of electrical energy. A telematics interface 110 can exchange information between the generator system 100 and a device remote therefrom. For example, the telematics interface 110 can provide indications of system status to a demote device. In some embodiments, the telematics interface 110 configured to provide a notification of a state of the generator set.

The controller 122, the generator 102, sensors 120, heating element 108, or telematics interface 110 can each include or interface with at least one processing unit or other logic device such as a programmable logic array engine, or module configured to communicate with a data repository or database. The controller 122, generator 102, sensors 120, heating element 108, or telematics interface 110, can be separate components, a single component, or part of the generator system 100. The generator system 100 and various components thereof can include hardware elements, such as one or more processors, logic devices, or circuits.

The controller 122 is coupled with the systems/components of the generator system 100 and can at least partly control the operation of the generator system 100 and associated vehicle. The controller 122 can implement the methods described in FIG. 4 below. The controller 122 can include one or more processors 124 and a memory 126. The processor 124 can include a microprocessor, an application-specific integrated circuit (ASIC), a field-programmable gate array (FPGA), etc., or combinations thereof. The memory 126 can include, but is not limited to, electronic, optical, magnetic, or any other storage or transmission device capable of providing a processor, ASIC, FPGA, etc.

with program instructions. The memory 126 can include a memory chip, Electrically Erasable Programmable Read-Only Memory (EEPROM), Erasable Programmable Read Only Memory (EPROM), flash memory, or any other suitable memory from which the controller 122 can read instructions. The instructions can include code from any suitable programming language. The memory 126 can include various modules that include instructions which are configured to be executed or otherwise implemented by the processor 124. Although an example processor 124 and memory 126 of controller 122 have been described with respect to FIG. 1, the subject matter including the operations described in this specification can be implemented in other types of digital electronic circuitry, or in computer software, firmware, or hardware, including the structures disclosed in this specification and their structural equivalents, or in combinations of one or more of them. The processor 124 and/or memory 126 can be implemented as hardware for performing operations other than control operations, including but not limited to any of various data storage, communication, and/or processing operations.

The controller 122 can be at least partially implemented by or can be communicably coupled with any of various control hardware (not shown) associated with operation of the generator 102, including but not limited to an engine control unit (ECU) or engine control module (ECM). In some embodiments, the controller 122 can receive or detect one or more signals, such as electrical signals or electronic signals, regarding operation of the generator 102. For example, the controller 122 can activate the heating element 108 to heat one or more components of the generator 102 or the aftertreatment system 150 based on determining a temperature associated with the generator system 100 is below a certain threshold. As another example, the controller 122 can implement delayed intake valve opening within an engine responsive to determining a temperature associated with the generator system 100 is below a certain threshold.

The controller 122 can include or be coupled with communications electronics. The communications electronics can conduct wired and/or wireless communications. For example, the communications electronics can include one or more wired (e.g., Ethernet, Modbus, PCIe, AXI, or CAN (e.g., J1939)) or wireless transceivers (e.g., a Wi-Fi transceiver, a Bluetooth transceiver, an NFC transceiver, or a cellular transceiver). The communications electronics can couple the controller 122 to one or more elements of the generator system 100. For example, the controller 122 can receive various temperature data or fill level data associated with the generator 102 via the communications electronics, convey various control signals to activate the heating element 108 via the communications electronics or switching components coupled thereto. The controller 122 can exchange information (e.g., commands or status information) with the telematics interface 110 via the communications electronics, such as the Modbus, J1939 or other transceiver as indicated above. The controller 122 can cause one or more operations disclosed, such as by employing another element of the generator system 100. For example, operations disclosed by other elements of the generator system 100 can be initiated, scheduled, or otherwise controlled by the controller 122.

The controller 122 is structured to control, at least partly, the operation of the generator 102 and associated systems, such as the heating element 108, switching components, or telematics interface 110. Communication between and among the components can be via any number of wired or wireless connections. In some embodiments, a controller area network (CAN) bus provides the exchange of signals, information, and/or information. The CAN bus includes any number of wired and wireless connections. The controller 122 can be, include, or interface with one or more electronic control units (ECU) coupled with the generator 102. Because the controller 122 is communicably coupled with the systems and components of FIG. 1, the controller 122 is structured to receive information from one or more of the components shown in FIG. 1.

The controller 122 can be communicatively coupled with any of the sensors 120 described herein, to receive information therefrom. Thus, the controller 122 can receive sensor data such as temperature data or fill level data from the various sensors 120. The controller 122 can actuate switching elements to selectively engage the heating element 108 based on the sensor data. The actuation of the switching element can connect the heating element 108 to an electrical power source. For example, the actuation can be of a switching element between an alternating current (AC) source and the heating element 108. The AC source can be a mains or other supply. The AC source can be coupled with a direct current (DC) converter, which can power the controller 122. The DC converter can be a battery charger configured to charge a battery of the generator set, the battery powering the controller 122. The battery can provide other power to the generator set, such as to start up the generator 102, or power other associated equipment (e.g., the telematics interface 110).

The generator 102 can include any energy conversion apparatus configured to receive a coolant. For example, generator 102 can include an internal combustion engine configured to receive a fuel into combustion cylinders of an engine block. The engine block can receive coolant through various passages to manage an engine temperature. For example, the coolant can cycle through a fluidic circuit between the engine block and a heat exchange device such as a radiator. The coolant can manage an engine temperature by transporting heat away from the engine (e.g., for dissipation at the radiator, as in the case of an engine operating at high load), or into the engine (e.g., contributing thermal energy to an engine such as prior to or following a cold start, wherein the contribution of the thermal energy can effect more complete combustion to lower output at startup. The combination of the generator 102 with a coolant system, and other accessory devices (e.g., certain of the sensors 120 disclosed herein) may be referred to as a generator set.

The generator system 100 can include various sensors 120 configured to detect data relevant to a determination of a coolant heating condition. The sensors 120 can include at least one temperature sensor 120 to detect a temperature associated with the generator 102. Such a temperature sensor 120 can include a contact or non-contact sensor 120. For example, the sensor 120 can include a thermistor-based sensor 120, a bimetallic sensor 120, a thermocouple sensor 120, or another sensor type. The sensor 120 can detect an air or coolant temperature, a temperature of an engine block, or another indication of a temperature associated with the generator set. The sensors 120 can include at least one fill level sensor 120 to detect an indication of a coolant fill level. For example, the sensor 120 can include a float valve, capacitive fluid level sensor 120, or other sensors 120 to detect a coolant level at one or more locations along a fluid path. The fluid sensors 120 can measure the coolant level according to a detection of the coolant itself, or based on other indicia of the coolant level (e.g., a detection of a pressure in a headspace above the coolant).

The generator system 100 can include one or more heating elements 108 configured to heat coolant. For example, the heating element 108 can include a resistive element configured to heat cooling in contact therewith. The resistive element can be coupled with electrical terminals configured to receive energy from an AC or DC source. For example, the electrical terminals can couple with a battery of the generator set, or with an AC source (e.g., mains power). The heating elements 108 can be separate from or integrated into a same assembly as other components, such as various sensors 120. For example, the heating element 108 and the temperature sensor 106 can be integral to a same assembly, such that the assembly engages or disengages a switching element based on the temperature detected by the temperature sensor 120. That is, an assembly including the temperature sensor 120 and heating element 108 can include one or more processors, relays, or other logic devices of the controller 122.

In some embodiments, the heating element 108 can include or be coupled with a coolant flow device. For example, the heating element 108 can interface with surfaces to circulate the coolant via convection based on the heating, or another flow device such as a pump or impeller. The coolant flow device can cause the coolant to circulate through a circuit therefor. For example, the coolant can flow through a fluid path including an engine block of the generator 102 and a heat exchange device. The coolant flow can reduce local hot spotting at a heat source such as the resistive element of the heating element 108. The flow device can receive electrical energy from same terminals as the resistive element.

In some instances, such as where the resistive element is not in contact with a coolant, or the coolant flow is inhibited, the heating element 108 may not heat the coolant or may heat a local portion of the coolant which does not raise the temperature of an engine block to a temperature associated with outputs which are less than a corresponding threshold. Further, the heating element 108 can boil off coolant or otherwise raise a local temperature in excess of a design temperature for elements of a coolant reservoir, or various other components in proximity thereto. Such a condition can correspond to a coolant heating condition which does not indicate heating of the coolant. A selective coupling of the heating element 108 to a power supply associated therewith (e.g., an AC or DC supply) can remove power from the heating element 108 to correspond to such a coolant heating condition.

The generator system 100 can include a telematics interface 110 configured to provide information corresponding to a status of the generator system 100, or receive commands associated with the generator system 100. For example, the telematics interface 110 can establish a communicative connection with one or more remote devices (not depicted), such as via a short message service (SMS), email, or other message provided over a wired or wireless link with the one or more remote devices. The telematics interface 110 can provide an indication of any of the information received, determined, or otherwise accessible to the controller 122 (e.g., any information of the data repository accessible to the controller 122). The telematics interface 110 can receive power from a same or different power source as the heating element 108. For example, the telematics interface 110 can receive power from the power source such that the telematics interface 110 is powered when the heating element 108 is connected to, or disconnected from, a power supply.

Figure 2:
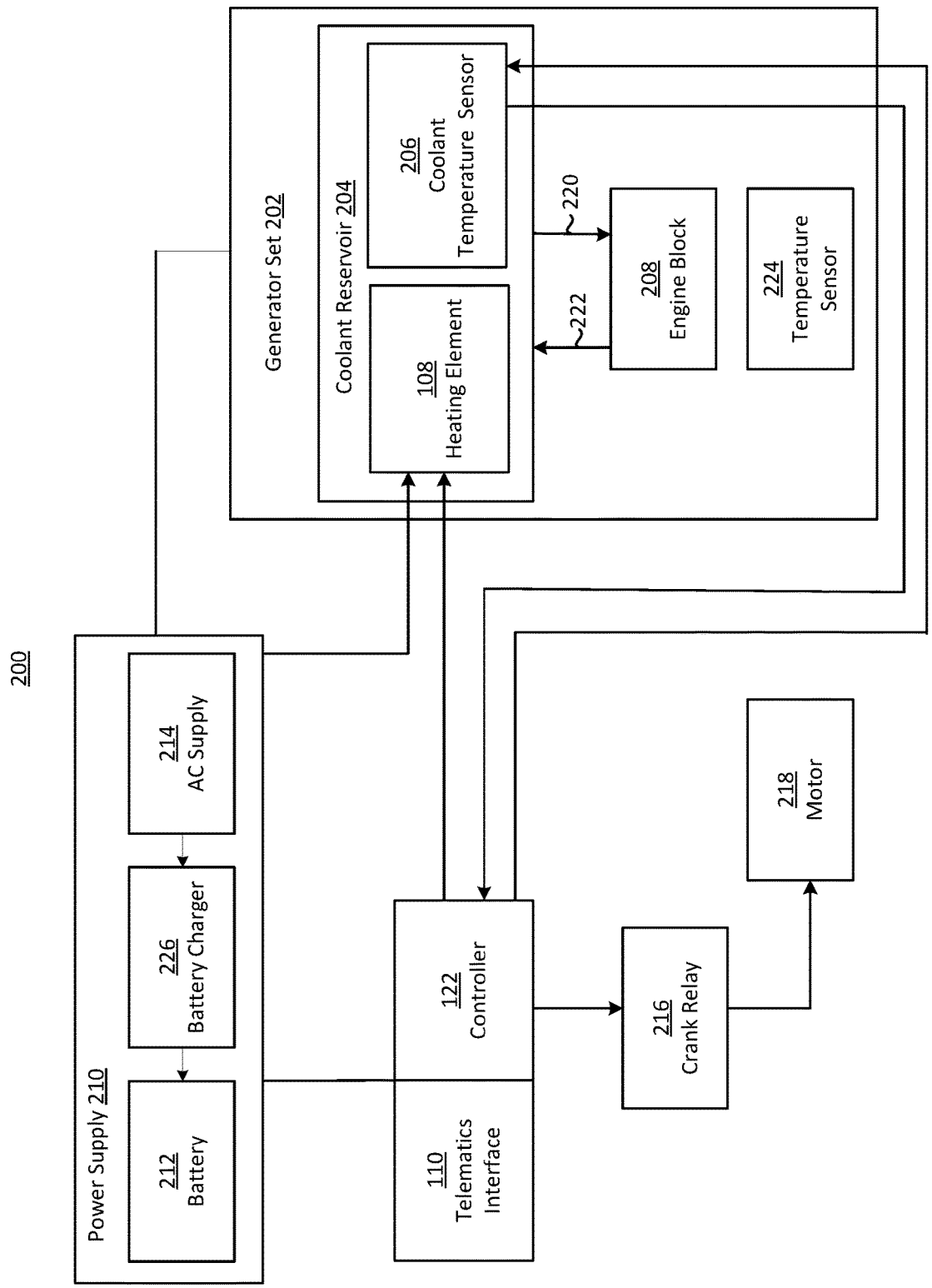
FIG. 2 is a block diagram of a mechanical generator system, according to some embodiments.

Referring now to FIG. 2, a block diagram of a generator system 200 including redundant power supplies is provided, according to some embodiments. The depicted generator system 200, along with further system 300 and 400 provided hereinafter are provided to depict features which can be implemented in various embodiments of the present disclosure. That is, various of the features depicted in FIG. 2, FIG. 3, and FIG. 4, and elsewhere in the present disclosure can be substituted, modified, omitted, or otherwise combined with other aspects disclosed herein.

Figure 4:
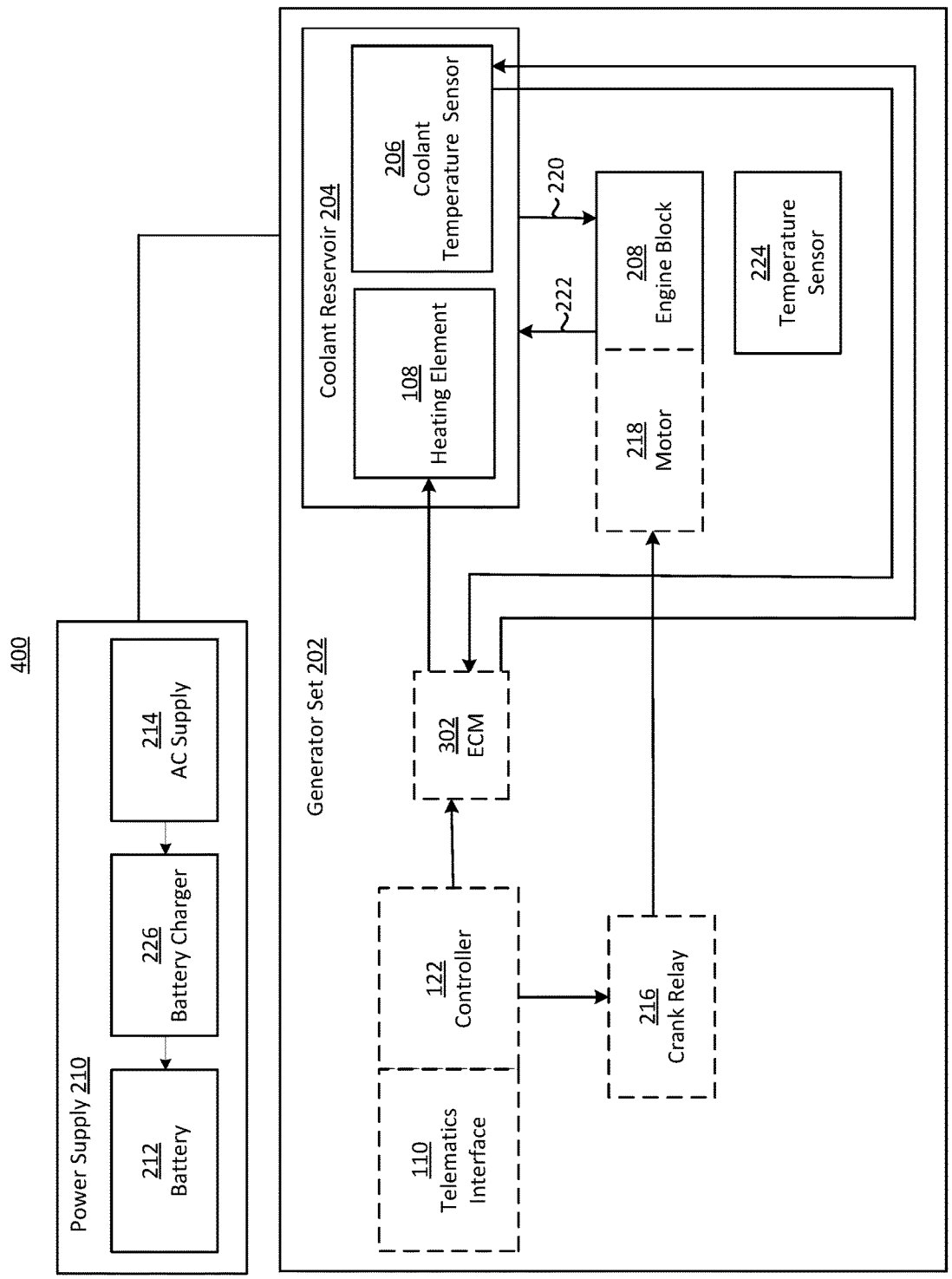
FIG. 4 is a block diagram of another embodiment of an electrical generator system, according to some embodiments.

As depicted, a generator set 202 includes an engine block 208 of an engine, the engine block 208 fluidly coupled with a coolant reservoir 204 (e.g., a radiator, coolant tank, etc.). For example, the fluidic coupling can include a coolant supply conduit 220 and a coolant return conduit 222. The coolant reservoir 204 can include or otherwise interface with a heating element 108 configured to heat the coolant, and a coolant level sensor 206 configured to detect a coolant level of the coolant. In various embodiments, the heating element 108 or coolant level sensor 206 can be disposed at another position of the fluid path. A temperature sensor 224 can determine a temperature associated with the coolant such as an air temperature, coolant temperature, engine block 208 temperature, or so forth. The coolant level sensor 206 and the temperature sensor 224 are communicatively coupled with the controller 122. For example, the coolant level sensor 206 and the temperature sensor 224 can be in network communication with the controller 122 via a wired or wireless network or can connect to the controller 122 via one or more discrete connections. In some embodiments, the telematics interface 110, controller 122, the crank relay, and the motor may be integrated in the generator set 202 as shown in FIG. 4.

A power supply 210 can include one or more sources configured to power various elements of the generator system 200. For example, the power supply 210 can include a DC supply such as a battery 212, and an AC supply 214 such as a mains power outlet. The power supply 210 can provide power to a starter motor (not depicted) of the generator set 202, the telematics interface 110, controller 122, heating element 108, or other components of the generator system 200. The battery 212 can receive power from a mains supply, or the generator set 202. For example, the battery 212 can provide power to the starter motor of the generator set 202 and receive power from an alternator (not depicted) of the generator set 202. The battery 212 can receive power from another source, such as the AC supply 214, via a battery charger 226. Thus, where an engine of the generator set 202 is in a ready or standby mode for a period of time that would otherwise deplete the battery 212 (e.g., via power provided to, for example, the heating element 108), the controls can cause the battery 212 can maintain a SoC in excess of a threshold value. In some instances, merely for ease of description and without limiting effect, a portion of a supply for the generator system 200 can be referred to as a separate supply. For example, the AC supply 214 can be referred to as a first power supply 210 and the battery 212 or other DC supply can be referred to as a second power supply 210.

The controller 122 can receive temperature data (e.g., an indication of a temperature) from respective sensors 120 of the generator set 202. The controller 122 can receive information from an interface such as an indication to engage or disengage the heating element 108. The indication to engage the heating element 108 can include pre-warming the engine prior to a planned engine start, placing the engine into a ready state in the absence of a planned engine start, or avoiding a freezing of the coolant. Responsive to the indication, the controller 122 can generate control signals for conveyance to the one or more switching elements, such as a switching element including a first pole connected to the power supply 210 and a second pole connected to the heating element 108 to electrically couple the power supply 210 to the heating element 108. In some embodiments, the controller 122 can execute instructions to perform one or more predefined actions in sequence in response to a detection of a coolant heating condition. For example, responsive to a detection of a coolant heating level which is less than a threshold, the controller 122 can cause cranking to be prevented by a crank relay 216, via the telematics interface 110. The controller 122 can disengage the heating element 108. In some instances, the controller 122 can further inhibit operation of the generator 102 (e.g., to prevent output levels from exceeding a predetermined level), cause an indication of a state of the generator set 202 to be conveyed to a remote device via the telematics interface 110, or otherwise alert a user to the coolant heating condition. In some embodiments, the crank relay 216 coupled with the controller 122, wherein the controller 122 is configured to control operation of the crank relay 216 to perform the modification of the cranking of the generator set 202, wherein the action comprises sending a signal to the crank relay 216 to prevent cranking of the generator set 202.

The controller 122 may be coupled to the crank relay 216 configured to facilitate cranking of the generator set 202 by enabling a starter motor 218. Based on the temperature values associated with the generator set 202 which are measured by the coolant temperature sensor 206 and the temperature sensor 224, the controller 122 may or may not allow the crank relay 216 and the starter motor 218 to activate the generator set 202. In some embodiments, the controller 122 may be configured to receive, from a sensor, a temperature value, evaluate one or more criteria for operation of the generator set based on the temperature value, and selectively engage the starter motor to turn on the generator set responsive to the one or more criteria being met.

Figure 3:
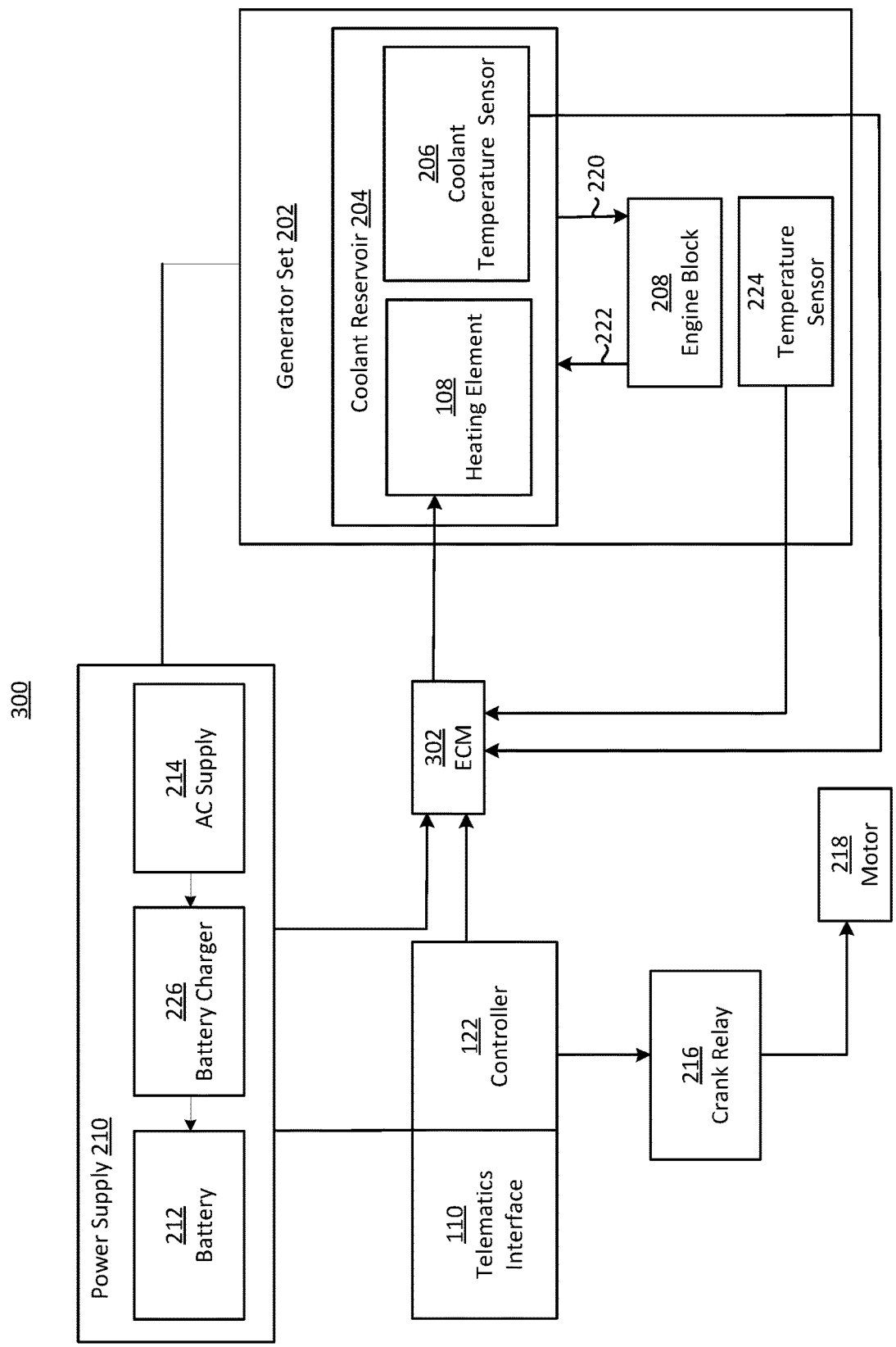
FIG. 3 is a block diagram of an electrical generator system including an engine control module, according to some embodiments.

Referring now to FIG. 3, a block diagram of a generator system 300 including an engine control module (ECM) 302 is provided, according to some embodiments. The ECM 302 can manage, regulate, or adjust the performance of the generator set 202 of the generator system 400. The ECM 302 can interface with the generator set 202 or other components via a same or different wired or wireless network as the controller 122. The ECM can monitor engine parameters such as fuel injection, air intake, or exhaust outputs, adjusting operation according to a control function to meet power output, fuel consumption, or other performance targets. The ECM 302 can diagnose engine problems, generate alerts or logs for maintenance needs, or otherwise monitor, control, or interface with the generator 102 of the generator system, or associated components (e.g., various sensors 120).

As depicted, the ECM 302 can be separate from the controller 122. The ECM 302 can integrate with various sensors 120 of the generator set 202 such as one or more temperature sensors 224 and one or more coolant temperature sensors 206. The ECM 302 can convey sensor data from the sensors 120 to the controller 122. The ECM 302 and the controller 122 can be powered by a same power supply 210 such as the depicted battery 212. Another power source (e.g., an AC supply 214) can selectively connect to the heating element 108 via one or more switching elements.

The controller 122 can actuate the one or more switching elements to cause the heating element 108 to heat coolant of the generator set 202. Such heating can be based on the data received from the ECM 302, such as a temperature less than a predefined threshold and a coolant level which is equal to or greater than another predefined threshold. The actuation, by the controller 122 (via a generation of control signals) can further be based on information received from a user interface local to the controller 122. For example, a command to start the engine of the generator set or inhibit startup of the generator set can be received by the controller 122. In some embodiment, the ECM 302 can communicate with various sensors 120 which are integral to the generator set 202, such that the controller 122 can interface with an existing generator set. According to various embodiments, various functions or circuits can be referred to as apportion to either of the controller 122 or the ECM 302. Indeed, various systems can include or interface with further processing circuits associated with further functions or devices.

In some embodiments, the generator system 300 includes an engine control module 302 coupled to the controller 122, wherein the first sensor and the second sensor are coupled to the engine control module 302, wherein the engine control module 302 is configured to transmit a signal to the controller 122 comprising an indication of at least one of the temperatures of the coolant or the ambient temperature.

Referring now to FIG. 4, a block diagram of a generator system 400 is shown. The generator system 400 is substantially similar to the generator system 200 and the generator system 300. However, in the generator system 400, the telematics interface 110, controller 122, the crank relay 216, the ECM 302, and the motor 218 may be integrated in the generator set 202 as shown in FIG. 4.

Figure 5:
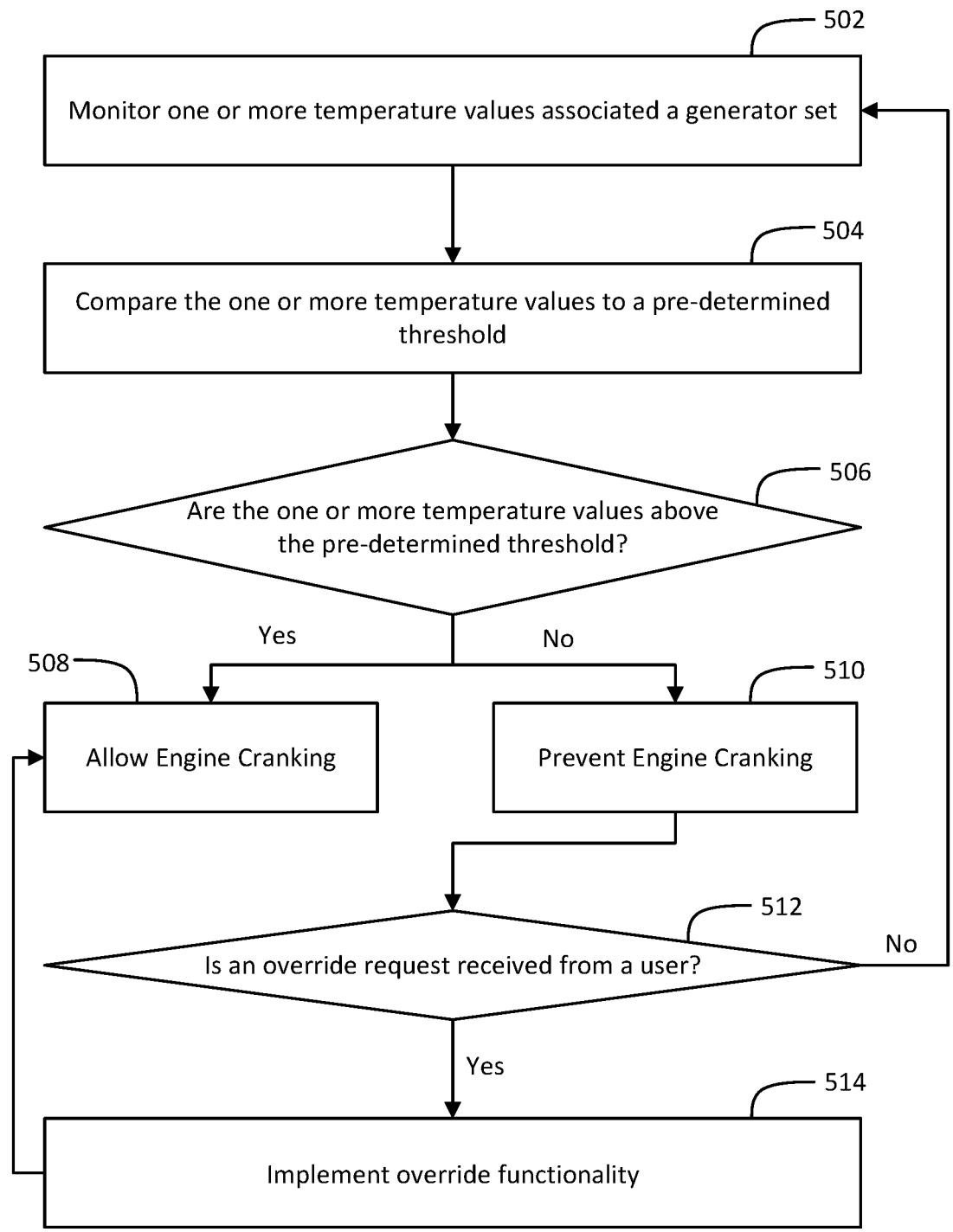
FIG. 5 is a flow diagram of a method of operation of a generator system, according to some embodiments.

Referring now to FIG. 5, a flow diagram of a method 500 for operating a generator set 202 is provided, according to some embodiments. The method 500 can be performed by a controller 122 including various circuits, instructions, processors, or other logical elements, such as the logical elements described at FIG. 6 or otherwise herein. For example, the controller 122 can be a controller of the various systems disclosed herein. In a brief overview, the method can include monitoring, by the controller 122, one or more temperature values associated with the generator set 202. The method can include comparing, by the controller 122, the one or more temperature values to a threshold. The method can include engaging the starter motor 218 to turn on the generator set 202 responsive to the one or more temperature values being above the threshold.

In further embodiments, the method can include preventing, by the controller 122, the starter motor 218 from turning on the generator set 202 responsive to the one or more temperature values being above the threshold. In some embodiments, the method can further include receiving, by the controller 122, an override request from a user responsive to preventing the starter motor from turning on the generator set 202. In some embodiments, the method can further include implementing, by the controller 122, an override functionality configured to turn on the generator set 202. In some embodiments, the method can further include generating, by the controller 122, a fault code indicating the implementation of override functionality and storing, by the controller 122, the fault code. In some embodiments, the method can further include sending, by the controller 122 via a telematics interface 110, an indication of the implementation of the override functionality to at least one of a user and a second user.

The method includes monitoring one or more temperature values associated with the generator set 202 at step 502. In some embodiments, the one or more temperature values associated with the generator set 202 may be provided by the coolant temperature sensor 206 or the temperature sensor 224. The temperature can be received as a temperature of a coolant, of an engine block, or of air proximal to a generator set 202 including the coolant. The temperature can be received according to various formats. For example, the temperature can be received as an analog or digital value corresponding to a numeric degree, a binary indication of a temperature relative to a predetermined threshold, or so forth.

The method includes comparing the one or more temperature values to a pre-determined threshold at step 504. The pre-determined threshold may be determined and set at a value that indicates that the generator set 202 is starting at a lower than desired temperature. As described, generator systems can encounter a variety of problems if they start and/or operate in cold temperatures. For example, at cold temperatures, oil availability for turbocharger bearing lubrication becomes sluggish and hence the risk of turbocharger failure increases. Also at cold temperatures, unburnt hydrocarbon (uHC) increases due to lower combustion temperatures which can cause incomplete combustion and misfiring. Therefore, the controller 122 may determine to compare the temperature values associated with the generator set 202 to a threshold to determine whether the one or more temperature values are above a pre-determined threshold at step 506. If the one or more temperature values are above the pre-determined threshold (e.g., the generator set 202 is operating at warm enough temperatures), the controller 122 will allow engine cranking at step 508. If the one or more temperature values are below the pre-determined threshold (e.g., the generator set 202 is not operating at warm enough temperatures), the controller will prevent engine cranking at step 510.

In some embodiments, the system can receive (e.g., from a user) an override request to provide to the controller subsequent to the controller preventing engine cranking. In case of emergency operation, if operator/customer wants to start engine or use alternate method of cold start aid, override functionality is also provided in the logic. However, in such a scenario, the controller logs the fault code with message-Cold Cranking Override Enable (COLD CRNK OVRD ENABLE). When the override functionality is enabled, additional information also will be available and stored in the controller 122 for traceability in future. This information may include: 1) acknowledgement that the manufacturer/service personal understands that the operator and customer has purposefully bypassed the cold start logic, 2) the number of overrides requested for the generator system. At step 512, the controller determines whether an override request has been received from a user. If a request is received, the controller will implement the override functionality at 514. If a request is not received, the method reverts to step 502.

In some embodiments, the override functionality may include generating a notification message as described above. For example, the controller may generate a message (e.g., instant notification (email & SMS) to an owner of the asset as well as maintenance or service personal through the telematics interface 110 that an override was requested and implemented.

Figure 6:
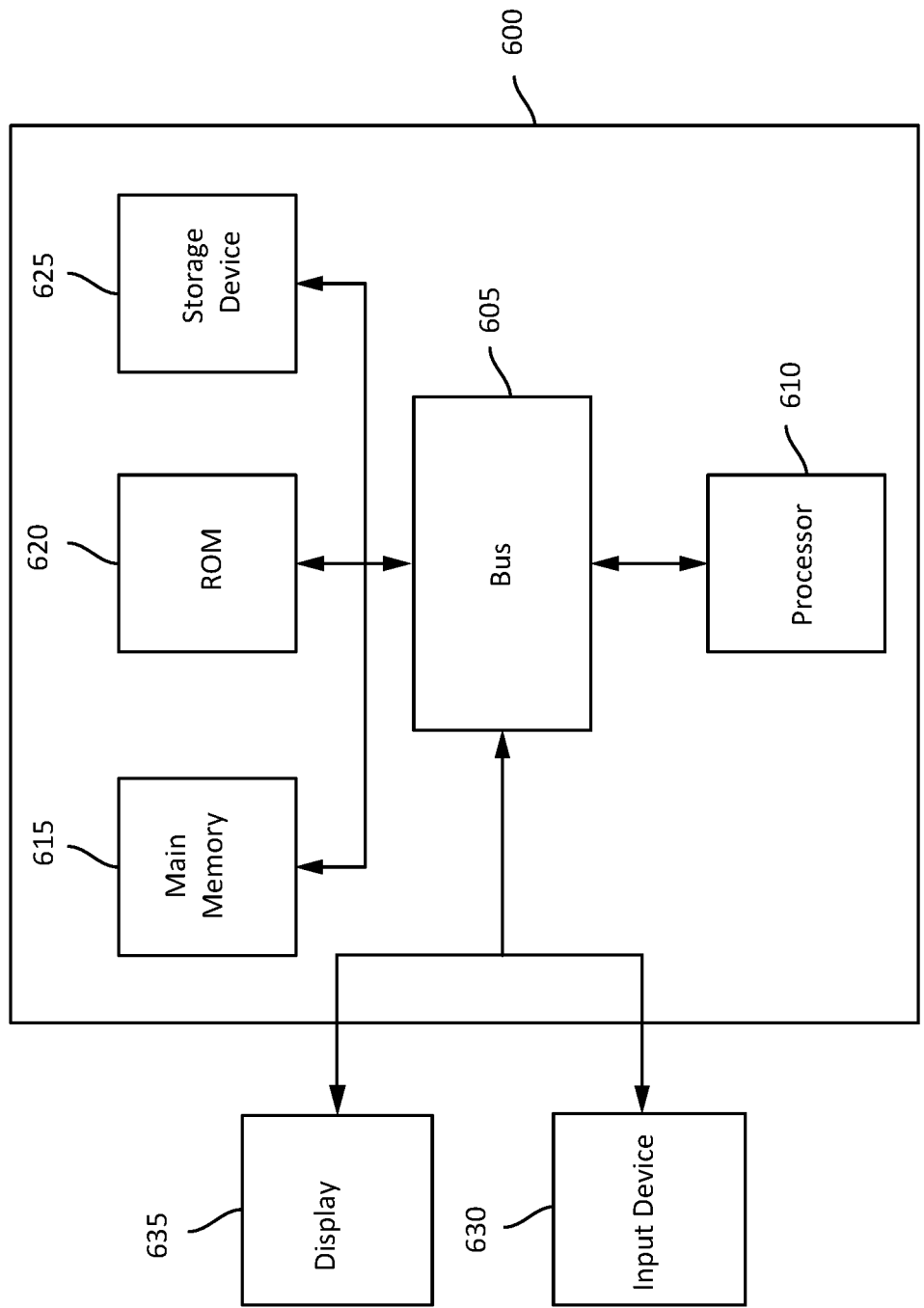
FIG. 6 is a block diagram illustrating an architecture for a computer system that can be employed to implement elements of the systems and methods described and illustrated herein.

FIG. 6 is a block diagram illustrating an architecture for a computing system 600 that can be employed to implement elements of the systems and methods described and illustrated herein. The computer system or computing system 600 can include or be used to implement a controller 122 or its components, and components of the systems provided herein. The computing system 600 includes at least one bus 605 or other communication component for communicating information and at least one processor 610 or processing circuit coupled with the bus 605 for processing information. The computing system 600 can also include one or more processors 610 or processing circuits coupled with the bus for processing information. The computing system 600 also includes at least one main memory 615, such as a random-access memory (RAM) or other dynamic storage device, coupled with the bus 605 for storing information, and instructions to be executed by the processor 610. The main memory 615 can be used for storing information during execution of instructions by the processor 610. The computing system 600 can further include at least one read only memory (ROM) 620 or other static storage device coupled with the bus 605 for storing static information and instructions for the processor 610. A storage device 625, such as a solid-state device, magnetic disk or optical disk, can be coupled with the bus 605 to persistently store information and instructions (e.g., for the data repository).

The computing system 600 can be coupled via the bus 605 to a display 635, such as a liquid crystal display, or active-matrix display. An input device 630, such as a keyboard or mouse can be coupled with the bus 605 for communicating information and commands to the processor 610. The input device 630 can include a touch screen display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement can also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining can be stationary (e.g., permanent or fixed) or moveable (e.g., removable or releasable). Such joining can be achieved with the two members coupled directly to each other, with the two members coupled with each other using one or more separate intervening members, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic. For example, circuit A communicably "coupled" to circuit B can signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure. The term "or," as used herein, is used in its inclusive sense (and not in its exclusive sense) so that when used to connect a list of elements, the term "or" means one, some, or all of the elements in the list.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the systems and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A generator set, comprising:
    a first sensor configured to detect a temperature of a coolant for the generator set;
    a second sensor configured to detect an ambient temperature around the generator set; and
    a controller configured to:
        receive an indication of the temperature of the coolant from the first sensor;
        receive an indication of the ambient temperature of the generator set from the second sensor;
        initiate a first action that comprises preventing cranking of the generator set based on the temperature of the coolant being below a first threshold; and
        initiate a second action in response to the ambient temperature of the generator set being below a second threshold and the temperature of the coolant being below the first threshold.

2. The generator set of claim 1, further comprising an engine control module coupled to the controller, wherein the first sensor and the second sensor are coupled to the engine control module, wherein the engine control module is configured to transmit a signal to the controller comprising an indication of at least one of the temperatures of the coolant or the ambient temperature.

3. The generator set of claim 2, wherein the controller is configured to: initiate a third action to modify cranking of the generator set in response to the temperature of the coolant being above the first threshold.

4. The generator set of claim 3, wherein the third action comprises allowing the cranking of the generator set.

5. The generator set of claim 1, comprising:
    a crank relay coupled with the controller, wherein the controller is configured to control operation of the crank relay to perform the preventing of the cranking of the generator set, wherein the action comprises sending a signal to the crank relay to prevent cranking of the generator set.

6. A system for starting a generator set, comprising:
    a starter motor configured to activate a generator set; and
    a controller configured to:
        receive, from a sensor, a temperature value of a coolant for the generator set;
        evaluate one or more criteria for operation of the generator set based on the temperature value;
        selectively engage the starter motor to turn on the generator set, responsive to the one or more criteria being met, including to prevent the starter motor from turning on the generator set responsive to the one or more criteria not being met;
        receive an override request from a user responsive to preventing the starter motor from turning on the generator set;
        implement an override functionality configured to turn on the generator set;
        generate a fault code indicating the implementation of the override functionality; and
        store the fault code.

7. The system of claim 6, further comprising:
    a telematics interface configured to provide a notification of a state of the generator set.

8. The system of claim 6, wherein the sensor is a first sensor and the temperature value is a first temperature value, the system further comprising a second sensor wherein the controller is configured to:
    receive, from the second sensor, a second temperature value;
    evaluate the one or more criteria for operation of the generator set based on the second temperature value and the first temperature value; and
    selectively engage the starter motor to turn on the generator set responsive to the one or more criteria being met.

9. The system of claim 8, wherein the controller is configured to evaluate the one or more criteria based on a threshold for a temperature of the coolant for the generator set.

10. The system of claim 8, wherein the controller is configured to evaluate the one or more criteria based on a threshold for an ambient temperature about the generator set, wherein a second temperature value indicates the ambient temperature about the generator set.

11. The system of claim 6, wherein the controller is configured to evaluate a first of the one or more criteria for operation of the generator set based on one or more threshold values for the temperature value.

12. The system of claim 9, wherein the first sensor is coupled to the controller, wherein the coupling between the first sensor and the controller comprises a communicative coupling between the first sensor and one or more processors of the controller, the one or more processors configured to engage the starter motor to turn on the generator set.

13. A method for operating a generator set, comprising:
monitoring, by a controller, one or more temperature values associated a coolant of with the generator set;
comparing, by the controller, the one or more temperature values to a threshold;
preventing a starter motor from turning on the generator set responsive to the one or more temperature values being below the threshold;
receiving, by the controller, an override request from a user responsive to preventing the starter motor from turning on the generator set;
implementing, by the controller, an override functionality configured to turn on the generator set;
generating, by the controller, a fault code indicating the implementation of override functionality; and
storing, by the controller, the fault code.

14. The method of claim 13, further comprising: sending, by the controller via a telematics interface, an indication of the implementation of the override functionality to at least one of a user and a second use.

* * * * *